Patented July 24, 1951

2,561,524

UNITED STATES PATENT OFFICE 2,561,524

VULCANIZATION CONTROLLING PROCESS

George M. Massie, Cuyahoga Falls, Ohio, assignor to Harrison & Morton Laboratories, Inc., Cuyahoga Falls, Ohio, a corporation of Ohio No Drawing. Application July 9, 1948, Serial No. 37,975

9 Claims. (Cl. 260—782)

This invention relates to the art of vulcanizing rubber or rubber-like compounds and particularly to an improved process wherein there is employed a member of a preferred class of compounds which improves the action of the accelerator employed in the vulcanization. More specifically, the preferred class of compounds acts to retard incipient vulcanization or scorch during the mixing, forming and storage stages of the process and provide for the more ready handling of the rubber stocks. In the later stage of the curing process, the preferred class of compounds do not exert such retarding action and may even accelerate the vulcanization.

It is well known that many accelerators, which are particularly effective in their accelerating action and are otherwise desirable, are limited in their commercial application in certain processes for the reason that such rubber mixes into which they are incorporated tend to prevulcanize or scorch during the mixing operation or on storage of the compounded mix. The use of internal mixers tends to elevate the temperature and in the further stages of processing, particularly in the calendering and extruding operations, the high temperatures encountered tend to cause prevulcanization.

As typical examples of accelerators which exhibit a tendency to scorch in varying degrees are the mercaptobenzothiazoles and the dithiocarbamates. Certain accelerators of the aldehyde-amine type, for example butyl aldehyde-aniline condensation products, when used alone, are comparatively inactive with regard to accelerating action at temperatures below approximately 220° F. These materials, however, may exhibit a relatively great tendency to scorch if processed at a higher temperature or if used in conjunction with an accelerator of the mercaptothiazole or dithiocarbamate type.

It has been recognized that certain types of accelerators of vulcanization become much more active in the presence of certain types of carbon black. Among such accelerators may be mentioned those of the mercaptothiazole and dithiocarbamate type which become more active with alkaline type carbon blacks. The increase in activity, when produced in this manner, takes place at low temperatures as well as the usual curing temperatures so that rubber mixes containing these types of accelerators and an alkaline type carbon black become difficult to handle due to prevulcanization during processing or during storage of the compounded mix.

It is the object of the present invention to provide a new class of compounds which will: (a) effectively control the vulcanization of rubber by retarding incipient vulcanization at low temperatures with little or no such action at the later stages of vulcanization at higher temperatures, (b) retard the initial cure at vulcanizing or high processing temperatures, (c) effectively control the scorching effect of alkaline carbon blacks.

In its broad aspect, my invention involves the discovery that materials such as bicyclo[2·2·1]5-heptene 2,3-dicarboxylic anhydride or its derivatives function in the above manner.

The invention may be practiced by using rubber compounds containing many different types of organic vulcanization accelerators among which may be mentioned:

Type I.—Aldehyde-amines:
    a. Acetaldehyde-aniline condensation products.
    b. Alpha ethyl beta propyl aerolein-aniline product.

Type II.—Guanidines:
    a. Diphenyl guanidine.
    b. Diortho tolyl guanidine.

Type III.—Thiazoles:
    a. 2-mercaptobenzothiazole.
    b. Zinc benzothiazyl sulfide.
    c. 2,2'-benzothiazyl disulfide.
    d. Dinitro phenyl benzothiazyl sulfide.
    e. Phenyl aminomethyl 2-benzothiazyl sulfide.
    f. Benzothiazyl 2 - monocyclohexyl sulfenamide.
    g. Dimethyl thiazyl disulfide.

Type IV.—Thiazolines:
    a. Mercapto thiazoline.
    b. Zinc thiazolinyl sulfide.

Type V.—Thiuram sulfides:
    a. Tetra ethyl thiuram disulfide.
    b. Tetra methyl thiuram mono sulfide.
    c. Di - N - pentamethylene thiuram tetrasulfide.

Type VI.—Dithiocarbamates:
    a. N-pentamethylene ammonium pentamethylene dithiocarbamate.
    b. Zinc diethyl dithiocarbamate.
    c. Lead (phenyl amino ethyl) phenyl dimethyl dithiocarbamate.
    d. Dinitro phenyl dimethyl dithiocarbamate.

The above list of materials serves only to indicate the scope of the invention and many modifications may be made. The preferred materials are also effective with two or more accelerators of the same type as well as with two or more accelerators of different type.

The preferred compound of the present invention is bicyclo[2·2·1]-5-heptene-2,3-dicarboxylic anhydride, but many other derivatives may be used, and function in like manner. Among those which may be mentioned is bicyclo[2·2·1]-5-heptene-2,3-dicarboxylic acid, and the metallic salts of bicyclo[2·2·1]-5-heptene-2,3-dicarboxylic acid such as calcium, zinc, magnesium, lead, aluminum, copper, iron, tin, cadmium and barium; the alkyl esters of primary alcohols, preferably wherein only one carboxyl group is esterified; the amine salts including the guanidine salts; the N-substituted imides; amidic acids; mono amide amine salts; and amine acid salts.

Bicyclo[2·2·1]-5-heptene-2,3-dicarboxylic anhydride may be prepared in accordance with the method described by Diels and Alder, Ann. vol. 460, page 98 (1928) or more directly by reacting maleic anhydride with dicyclopentadiene at a temperature above 170° C., preferably at 195 to 200° C. The dicyclopentadiene may be a relatively impure commercial grade. The resulting crude product obtained by heating maleic anhydride with dicyclopentadiene may be used as an impure product or may be further purified.

The esters, imides, amine salts, amidic acids, mono amide amine salts, and amine acid salts may be prepared by suitable modification of the methods described by Lowy et al., J. Am. Chem. Soc. vol. 66, page 404 (1944). Mono esters may be conveniently prepared at low temperatures in accordance with the reaction described by Siegel and Moran, ibid., vol. 69, page 1457 (1947).

Bicyclo heptene dicarboxylic anhydride may exist in the endo or exo configuration with regard to the bicyclo heptene ring and in the cis and/or trans configuration with regard to the carboxyl groups. The compound as prepared in accordance with the method of Diels and Alder is predominately in the endo-cis-configuration.

I do not wish to be bound, however, by method of preparation or by configuration, but desire to be protected by Letters Patent, for the use of the materials for the purposes described.

The materials may be added to the rubber during the mixing operation and it is preferable to add the materials prior to the addition of sulfur and accelerator. By this method of introduction the maximum safety is assured.

The materials may, however, be added to the rubber compound at other points in the milling or processing operations and still obtain beneficial results.

In order to more clearly illustrate my invention, the preferred modes of carrying the same into effect and the advantageous results to be obtained thereby, the following examples are given:

EXAMPLE I

This example demonstrates the use of bicyclo[2·2·1]-5-heptene-2,3-dicarboxylic anhydride in a rubber stock accelerated with 2-mercaptobenzothiazole.

Three different stocks were compounded, the composition being as follows:

| Stock | A | B | C |
|---|---|---|---|
| Rubber (Smoked Sheets) | 100 | 100 | 100 |
| Carbon Black (EPC type) | 48 | 48 | 48 |
| Zinc Oxide | 5 | 5 | 5 |
| Stearic Acid | 3 | 3 | 3 |
| Sulfur | 2.75 | 2.75 | 2.75 |
| Paraflux | 2 | 2 | 2 |
| 2-mercaptobenzothiazole | 1.0 | 1.0 | 1.0 |
| Bicyclo[2·2·1]-5-heptene-2,3-dicarboxylic anhydride | | 0.25 | 0.75 |

The stocks so compounded were vulcanized by heating in a press in the well-known manner for varying periods of time at a temperature of 280° F. On testing the cured rubber product, the following results set forth in Table I were obtained.

Table I

| Stock | Cure time minutes at 280° F. | Tensile at break in lbs./in.² | Ult. Elong., Percent | Modulus of elasticity in lbs./in.² at elongations of— | |
|---|---|---|---|---|---|
| | | | | 300% | 500% |
| A | 20 | 3,000 | 590 | 930 | 2,240 |
| B | 20 | 3,155 | 630 | 845 | 2,170 |
| C | 20 | 2,575 | 560 | 805 | 2,070 |
| A | 40 | 3,835 | 590 | 1,320 | 2,990 |
| B | 40 | 3,950 | 600 | 1,220 | 3,000 |
| C | 40 | 3,835 | 610 | 1,260 | 2,835 |
| A | 60 | 3,890 | 570 | 1,470 | 3,205 |
| B | 60 | 3,915 | 570 | 1,455 | 3,210 |
| C | 60 | 4,070 | 560 | 1,470 | 3,325 |
| A | 90 | 3,735 | 530 | 1,650 | 3,490 |
| B | 90 | 3,870 | 540 | 1,510 | 3,485 |
| C | 90 | 3,830 | 550 | 1,560 | 3,315 |

At the proper cure (60 minutes at 280° F.) it is seen that the physical properties of all three stocks are practically identical and that bicyclo[2·2·1]-5-heptene-2,3-dicarboxylic anhydride does not exert a retarding action in the later stage of the curing process.

In order to show the retarding effects on incipient vulcanization or scorch plasticity, data were obtained on the uncured rubber stocks using the Mooney viscometer described by M. Mooney "Industrial and Engineering Chemistry," Anal. Ed., vol. 6, page 147 (1934). Relative scorch tendency based on plasticity data was determined in accordance with the method described by Taylor, Fielding and Mooney, "Rubber Age," vol. 61, pages 567 and 705 (1947).

The time required to cause incipient vulcanization of the above three uncured rubber stocks is shown in Table II.

Table II

| Stock | Minutes required at 250° F. to cause incipient vulcanization |
|---|---|
| A | 18 |
| B | 24 |
| C | 30 |

EXAMPLE II

This example demonstrates the use of bicyclo[2·2·1]-5-heptene-2,3-dicarboxylic anhydride in a pure gum type stock accelerated with various accelerators including a number of the thiazole type and one of the thiuram disulfide type. The compositions were as follows:

| Stock | A | B | C | D | E | F |
|---|---|---|---|---|---|---|
| Rubber (Smoked Sheets) | 100 | 100 | 100 | 100 | 100 | 100 |
| Zinc Oxide | 10 | 10 | 10 | 10 | 10 | 10 |
| Sulfur | 3 | 3 | 3 | 3 | 3 | 3 |
| Stearic Acid | 2 | 2 | 2 | 2 | 2 | 2 |
| Benzothiazyl 2-cyclohexyl sulfenamide | 1.0 | 1.0 | | | | |
| 2,2′ benzothiazyl disulfide | | | 1.0 | 1.0 | | |
| Tetra methyl thiuram disulfide | | | | | 0.4 | 0.4 |
| Bicyclo[2·2·1]-5-heptene-2,3-dicarboxylic anhydride | | 0.5 | | 0.5 | | 0.5 |

The stocks so compounded were vulcanized in a press and the vulcanized product on testing gave the following results set forth in Table III.

Table III

| Stock | Cure | | Tensile at break in lbs./in.² | Ult. Elong., percent | Modulus of elasticity in lbs./in.² at elongations of 600% |
|---|---|---|---|---|---|
| | Time, Minutes | Temp., °F. | | | |
| A | 30 | 287 | 3,610 | 610 | 3,390 |
| B | 30 | 287 | 3,860 | 620 | 3,495 |
| C | 30 | 287 | 3,880 | 730 | 1,855 |
| D | 30 | 287 | 3,725 | 750 | 1,610 |
| E | 20 | 258 | 3,985 | 620 | 3,550 |
| F | 20 | 258 | 4,045 | 630 | 3,620 |

Relative time required to cause incipient vulcanization as determined in the Mooney viscometer on the uncured rubber stocks is set forth in Table IV.

Table IV

| Stock | Minutes required to cause incipient vulcanization at 250° F. |
|---|---|
| A | 30 |
| B | 42 |
| C | 25 |
| D | 45 |
| E | 7 |
| F | 10 |

EXAMPLE III

This example demonstrates the use of bicyclo-[2·2·1]-5-heptene-2,3-dicarboxylic anhydride in a tread type stock containing accelerators of a number of types. The compositions were as follows:

| Stock | A | B | C | D | E | F | G | H | J | K | L | M | N | O | P | R |
|---|---|---|---|---|---|---|---|---|---|---|---|---|---|---|---|---|
| Rubber (Smoked Sheets) | 100 | | | | | | | | | | | | | | | |
| EPC Black | 48 | | | | | | | | | | | | | | | |
| Zinc Oxide | 5 | | | | | | | | | | | | | | | |
| Stearic Acid | 3 | | | | | | | | | | | | | | | |
| Sulfur | 3 | | | | | | | | | | | | | | | |
| Antioxidant | 1 | | | | | | | | | | | | | | | |
| Paraflux | 2 | | | | | | | | | | | | | | | |
| Diphenyl Guanidine | 1.2 | 1.2 | | | | | | | | | | | | | | |
| Zinc benzothiazyl sulfide | | | 1.1 | 1.1 | | | | | | | | | | | | |
| Lead (phenylamino ethyl) phenyl dimethyl dithiocarbamate | | | | | 1.1 | 1.1 | | | | | | | | | | |
| Alpha ethyl beta propyl acrolein-Aniline | | | | | | | 1.0 | 1.0 | | | | | | | | |
| Benzothiazyl 2-cyclohexyl sulfenamide | | | | | | | | | 0.8 | 0.8 | | | | | | |
| 2-mercapto thiazoline | | | | | | | | | | | 1.0 | 1.0 | | | | |
| 2-mercapto benzothiazole | | | | | | | | | | | | | 0.9 | 0.9 | | |
| Diphenyl Guanidine | | | | | | | | | | | | | 0.1 | 0.1 | | |
| Amine salt of dibutyl dithiocarbamic acid | | | | | | | | | | | | | | | 0.4 | 0.4 |
| Bicyclo[2·2·1]-5-heptene-2,3-dicarboxylic anhydride | | 0.25 | | 0.75 | | 0.75 | | 0.75 | | 0.75 | | 0.75 | | 0.75 | | 0.75 |

The stocks so compounded were vulcanized by heating in a press at a temperature of 287° F. On testing the cured rubber products, the following results set forth in Table V were obtained.

Table V

| Stock | Cure time at 287° F., Minutes | Tensile at break in lbs./in.² | Ult. Elong., per cent | Modulus of elasticity in lbs./in.² at elongations of— | |
|---|---|---|---|---|---|
| | | | | 300 Per Cent | 500 Per Cent |
| A | 75 | 3,980 | 540 | 1,675 | 3,665 |
| B | 75 | 3,765 | 540 | 1,485 | 3,375 |
| C | 45 | 3,480 | 520 | 1,590 | 3,340 |
| D | 45 | 3,630 | 540 | 1,555 | 3,340 |
| E | 20 | 4,355 | 600 | 1,400 | 3,360 |
| F | 20 | 4,315 | 610 | 1,235 | 3,060 |
| G | 90 | 2,735 | 560 | 925 | 2,265 |
| H | 90 | 2,455 | 590 | 750 | 1,860 |
| J | 30 | 4,360 | 600 | 1,420 | 3,365 |
| K | 30 | 4,515 | 610 | 1,320 | 3,265 |
| L | 45 | 4,290 | 570 | 1,560 | 3,525 |
| M | 45 | 4,410 | 570 | 1,550 | 3,550 |
| N | 45 | 4,050 | 610 | 1,250 | 2,960 |
| O | 45 | 4,010 | 610 | 1,255 | 3,020 |
| P | 20 | 4,390 | 680 | 1,175 | 2,920 |
| R | 20 | 4,130 | 660 | 1,100 | 2,695 |

Relative time required to cause incipient vulcanization determined in the Mooney viscometer on the uncured rubber stocks is set forth in Table VI.

Table VI

| Stock | Minutes required to cause incipient vulcanization at 250° F. |
|---|---|
| A | 21 |
| B | 30 |
| C | 26 |
| D | 31.5 |
| E | 15.5 |
| F | 21 |
| G | 37.5 |
| H | 78 |
| J | 25 |
| K | 33 |
| L | 9 |
| M | 14.5 |
| N | 20 |
| O | 26 |
| P | 16 |
| R | 23 |

EXAMPLE IV

This example demonstrates the use of bicyclo[2·2·1]-5-heptene-2,3-dicarboxylic anhydride in rubber stocks accelerated with 2-mercapto benzothiazole and containing carbon blacks of different type and alkalinity. The compositions were as follows:

| Stock | A | B | C | D | E | F | G | H | J | K | L | M |
|---|---|---|---|---|---|---|---|---|---|---|---|---|
| Rubber (Smoked Sheets) | 100 | | | | | | | | | | | |
| Zinc Oxide | 5 | | | | | | | | | | | |
| Stearic Acid | 3 | | | | | | | | | | | |
| Sulfur | 3 | | | | | | | | | | | |
| Paraflux | 2 | | | | | | | | | | | |
| Antioxidant | 1 | | | | | | | | | | | |
| 2-mercapto benzothiazole | 1 | | | | | | | | | | | |
| EPC Black | 50 | 50 | | | | | | | | | | |
| HAF Black | | | 50 | 50 | | | | | | | | |
| FF Black | | | | | 50 | 50 | | | | | | |
| SRF Black | | | | | | | 50 | 50 | | | | |
| HMF Black | | | | | | | | | 50 | 50 | | |
| FF Black | | | | | | | | | | | 50 | 50 |
| Bicyclo[2·2·1]-5-heptene-2,3-dicarboxylic anhydride | | 0.75 | | 0.75 | | 0.75 | | 0.75 | | 0.75 | | 0.75 |

The stocks so compounded were vulcanized by heating in a press at a temperature of 287° F. On testing the cured rubber product the following results set forth in Table VII were obtained.

*Table VII*

| Stock | Cure time Minutes at 287° F. | Tensile at break in lbs./in.² | Ult. Elong., percent | Modulus of elasticity in lbs./in.² at elongations of— | |
|---|---|---|---|---|---|
| | | | | 300% | 500% |
| A | 45 | 3,775 | 550 | 1,595 | 3,345 |
| B | | 3,775 | 560 | 1,515 | 3,240 |
| C | 30 | 3,315 | 410 | 2,285 | |
| D | | 3,270 | 430 | 2,210 | |
| E | 30 | 3,070 | 650 | 575 | 1,565 |
| F | | 3,055 | 640 | 580 | 1,645 |
| G | 30 | 3,040 | 530 | 1,400 | 2,610 |
| H | | 3,020 | 560 | 1,360 | 2,620 |
| J | 30 | 3,070 | 440 | 2,030 | |
| K | | 3,100 | 450 | 2,040 | |
| L | 30 | 3,550 | 510 | 1,675 | 3,420 |
| M | | 3,520 | 550 | 1,505 | 3,140 |

Relative time required to cause incipient vulcanization determined in the Mooney viscometer is set forth in Table VIII.

*Table VIII*

| Stock | Minutes required at 250° F. to cause incipient vulcanization |
|---|---|
| A | 14 |
| B | 24 |
| C | 15.5 |
| D | 20.5 |
| E | 10 |
| F | 22 |
| G | 11 |
| H | 16.5 |
| J | 6.5 |
| K | 10.5 |
| L | 9 |
| M | 14 |

It is thus seen from the data set forth in Table VIII that carbon blacks of relatively high alkalinity (e. g., H. M. F. Black and F. F. Black) have an activating effect on incipient vulcanization as compared to E. P. C. Black. Bicyclo-[2·2·1]-5-heptene-2,3-dicarboxylic anhydride in effectively increasing the time required to cause incipient vulcanization at processing temperature, markedly increases processing safety. In the case of SRF Black, the time required to cause incipient vulcanization has been extended more than two-fold.

EXAMPLE V

This example demonstrates the use of bicyclo-[2·2·1]-5-heptene-2,3-dicarboxylic anhydride, bicyclo[2·2·1]-5-heptene-2,3-dicarboxylic acid, and the mono methyl ester of bicyclo[2·2·1]-5-heptene-2,3-dicarboxylic acid in a rubber stock accelerated with 2-mercapto benzothiazole. The compositions were as follows:

| Stock | A | B | C | D |
|---|---|---|---|---|
| Rubber (Smoked Sheets) | 100 | 100 | 100 | 100 |
| Zinc Oxide | 10 | 10 | 10 | 10 |
| Sulfur | 3 | 3 | 3 | 3 |
| Stearic Acid | 2 | 2 | 2 | 2 |
| 2-mercapto benzothiazole | 1 | 1 | 1 | 1 |
| Bicyclo[2·2·1]-5-heptene-2,3-dicarboxylic anhydride | | 0.5 | | |
| Bicyclo[2·2·1]-5-heptene-2,3-dicarboxylic acid | | | 0.5 | |
| Mono methyl ester of bicyclo[2·2·1]-5-heptene-2,3-dicarboxylic acid | | | | 0.5 |

The stocks so compounded were vulcanized by heating in a press at a temperature of 287° F. On testing the cured rubber product the following results set forth in Table IX were obtained.

*Table IX*

| Stock | Cure time Minutes at 287° F. | Tensile at break in lbs./in.² | Ult. Elong., percent | Modulus of elasticity at elongation of 600% |
|---|---|---|---|---|
| A | 30 | 3,095 | 720 | 1,535 |
| B | 30 | 3,065 | 740 | 1,315 |
| C | 30 | 3,025 | 760 | 1,400 |
| D | 30 | 3,075 | 740 | 1,360 |
| A | 40 | 3,165 | 730 | 1,525 |
| B | 40 | 3,335 | 740 | 1,480 |
| C | 40 | 3,265 | 730 | 1,485 |
| D | 40 | 3,345 | 740 | 1,485 |

Relative time required to cause incipient vulcanization determined in the Mooney viscometer on the uncured rubber stocks is set forth in Table X.

*Table X*

| Stock | Minutes required to cause incipient vulcanization at 250° F. |
|---|---|
| A | 18 |
| B | 34 |
| C | 19 |
| D | 31 |

EXAMPLE VI

This example demonstrates the use of bicyclo-[2·2·1]-5-heptene-2,3-dicarboxylic anhydride as a retarder of incipient vulcanization at a number of different temperatures. The temperatures employed fall within the range encountered in practical mixing operation.

Two different stocks were compounded by the so-called "split-batch" method, the composition being as follows:

| Stock | Parts by Weight | |
|---|---|---|
| | A | B |
| Rubber (Smoked Sheets) | 100 | 100 |
| Zinc Oxide | 10 | 10 |
| Sulfur | 3 | 3 |
| Stearic Acid | 2 | 2 |
| 2-mercapto benzothiazole | 1 | 1 |
| Bicyclo[2·2·1]-5-heptene-2,3-dicarboxylic anhydride | | 0.75 |

Relative time required to cause incipient vulcanization at different temperatures determined in the Mooney viscometer on the uncured rubber stocks is set forth in Table XI.

*Table XI*

| Stock | Temperature, F° | Minutes required to cause incipient vulcanization | Percent improvement in time required to cause incipient vulcanization |
|---|---|---|---|
| | | | Per cent |
| A | 220 | 40 | |
| B | 220 | 125 | 21.2 |
| A | 250 | 18 | |
| B | 250 | 43 | 138.8 |
| A | 280 | 8 | |
| B | 280 | 15.5 | 93.7 |
| A | 300 | 5.5 | |
| B | 300 | 9 | 63.6 |

EXAMPLE VII

This example demonstrates the use of a number of metallic bicyclo[2·2·1]-5-heptene-2,3-dicarboxylates in a rubber stock accelerated with 2-mercapto benzothiazole. The compositions were as follows:

| Stock | A | B | C | D | E | F |
|---|---|---|---|---|---|---|
| Rubber (Smoked Sheets) | 100 | 100 | 100 | 100 | 100 | 100 |
| EPC Black | 48 | 48 | 48 | 48 | 48 | 48 |
| Zinc Oxide | 5 | 5 | 5 | 5 | 5 | 5 |
| Stearic Acid | 3 | 3 | 3 | 3 | 3 | 3 |
| Sulfur | 3 | 3 | 3 | 3 | 3 | 3 |
| Paraflux | 2 | 2 | 2 | 2 | 2 | 2 |
| Antioxidant | 1 | 1 | 1 | 1 | 1 | 1 |
| 2-mercapto benzothiazole | 1 | 1 | 1 | 1 | 1 | 1 |
| Zinc bicyclo[2·2·1]-5-heptene-2,3-dicarboxylate | | 0.75 | | | | |
| Calcium bicyclo[2·2·1]-5-heptene-2,3-dicarboxylate | | | 0.75 | | | |
| Barium bicyclo[2·2·1]-5-heptene-2,3-dicarboxylate | | | | 0.75 | | |
| Cadmium bicyclo[2·2·1]-5-heptene-2,3-dicarboxylate | | | | | 0.75 | |
| Cupric bicyclo[2·2·1]-5-heptene-2,3-dicarboxylate | | | | | | 0.75 |

The stocks so compounded were vulcanized by heating in a press at a temperature of 287° F. On testing the cured rubber product, the following results set forth in Table XII were obtained.

*Table XII*

| Stock, Cured 40 mins. at 287° F. | Tensile at Break in lbs./in.² | Ult. Elong., percent | Modulus of Elasticity in lbs./in.² at elongations of— | |
|---|---|---|---|---|
| | | | 300% | 500% |
| A | 4,175 | 560 | 1,435 | 3,245 |
| B | 3,850 | 570 | 1,365 | 3,195 |
| C | 3,860 | 570 | 1,400 | 3,240 |
| D | 3,840 | 560 | 1,420 | 3,260 |
| E | 3,995 | 580 | 1,440 | 3,210 |
| F | 4,020 | 590 | 1,375 | 3,215 |

Relative time required to cause incipient vulcanization determined in the Mooney viscometer on the uncured rubber stocks is set forth in Table XIII.

*Table XIII*

| Stock | Minutes required to cause incipient vulcanization at 250° F. |
|---|---|
| A | 13 |
| B | 16 |
| C | 16 |
| D | 16 |
| E | 16 |
| F | 17 |

The preferred method of practicing the invention is to employ from 0.1 to 2.0% of the retarder material in the rubber composition but the quantity to be employed is dependent upon several considerations, such as (a) type of rubber composition, (b) amount of retardation desired, (c) accelerator employed, (d) retarder material employed.

In certain cases, it is advantageous to use the retarder materials mixed with other substances such as a finely divided solid or an oil. For certain cases, it is advantageous to use a mixture of two or more of the preferred materials.

The term "rubber" is to be construed broadly as rubber in the form of or derived from naturally occurring rubber dispersions or in the form of artificially prepared sulfur vulcanizable elastomers.

This invention is not restricted to the use of the particular materials disclosed in the specification, nor is it restricted to the use of the preferred class of materials in the particular rubber compositions herein described, since other rubber compositions employing a wide variety of compounding ingredients are readily apparent to one versed in the art.

What I claim is:

1. A process of treating a rubber compound containing sulphur and organic accelerator, for controlling the vulcanization thereof, consisting in incorporating in the compound 0.1 to 2 percent of material selected from the group consisting of bicyclo[2.2.1]-5-heptene-2,3-dicarboxylic acid, the anhydride thereof, the aluminum, calcium, barium, magnesium, zinc, copper, iron, tin, lead and cadmium salts thereof, and the mono methyl ester thereof.

2. A process of treating a rubber compound containing sulfur and organic accelerator for controlling the vulcanization thereof consisting in incorporating in the compound 0.1 to 2 per cent of bicyclo[2.2.1]-5-heptene-2,3-dicarboxylic anhydride.

3. A process of treating a rubber compound containing sulfur and organic accelerator for controlling the vulcanization thereof, consisting in incorporating in the compound 0.1 to 2 per cent of a metallic salt of bicyclo[2.2.1]-5-heptene-2,3-dicarboxylic acid where the metal is a member of the group consisting of aluminum, calcium, barium, magnesium, zinc, copper, iron, tin, lead, and cadmium.

4. A process of treating a rubber compound containing sulfur and organic accelerator for controlling the vulcanization thereof consisting in incorporating in the compound 0.1 to 2 per cent of mono methyl ester of bicyclo[2.2.1]-5-heptene-2,3-dicarboxylic acid.

5. The process of retarding the vulcanization of rubber which comprises heating a mixture of rubber, sulfur, and an accelerator selected from the group consisting of mercapto benzothiazole and derivatives thereof in the presence of 0.1 to 2 per cent of bicyclo[2.2.1]-5-heptene-2,3-dicarboxylic anhydride.

6. A rubber composition retarded as to incipient vulcanization at elevated temperatures including sulfur, organic accelerator, and 0.1 to 2 per cent of bicyclo[2.2.1]-5-heptene-2,3-dicarboxylic anhydride.

7. A process of preparing a rubber compound including sulfur and an organic accelerator designed to prevent vulcanization during the mixing and processing operations, consisting in incorporating into the rubber compound 0.1 to 2 per cent of bicyclo[2.2.1]-5-heptene-2,3-dicarboxylic anhydride.

8. The process of treating a rubber compound designed to retard the activating effect of carbon black on vulcanization at low temperatures, consisting in incorporating in the rubber, an organic accelerator, sulfur, carbon black, and as a retarder bicyclo[2.2.1]-5-heptene-2,3-dicarboxylic anhydride.

9. The process of retarding the vulcanization of rubber which comprises heating a mixture of rubber, sulfur and organic accelerator in the presence of 0.1 to 2 per cent of bicyclo[2·2·1]-5-heptene-2,3-dicarboxylic anhydride.

GEORGE M. MASSIE.

REFERENCES CITED

The following references are of record in the file of this patent:

UNITED STATES PATENTS

| Number | Name | Date |
|---|---|---|
| 1,844,943 | Cadwell | Feb. 16, 1932 |
| 2,288,779 | Bradley | July 7, 1942 |
| 2,391,226 | Clifford et al. | Dec. 18, 1945 |
| 2,394,815 | Soday | Feb. 12, 1946 |
| 2,423,234 | Gerhart et al. | July 1, 1947 |